US012585659B2

(12) United States Patent
Patton et al.

(10) Patent No.: US 12,585,659 B2
(45) Date of Patent: Mar. 24, 2026

(54) SUGGESTION ENGINE FOR DATA CENTER MANAGEMENT AND MONITORING CONSOLE

(71) Applicant: Dell Products, L.P., Round Rock, TX (US)

(72) Inventors: Margaret Jenae Patton, Austin, TX (US); Saurav Shrestha, Round Rock, TX (US); Carlin Mendonca, Austin, TX (US); Jeffrey M. Lairsey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 17/582,906

(22) Filed: Jan. 24, 2022

(65) Prior Publication Data

US 2023/0237060 A1     Jul. 27, 2023

(51) Int. Cl.
*G06F 16/2457*          (2019.01)
*G06V 40/16*            (2022.01)

(52) U.S. Cl.
CPC ...... *G06F 16/24578* (2019.01); *G06V 40/174* (2022.01)

(58) Field of Classification Search
CPC ............... G06F 16/217; G06F 16/2282; G06F 11/3409; G06F 16/24578
USPC ........................................................ 707/728
See application file for complete search history.

(56) References Cited

U.S. PATENT DOCUMENTS

| | | | | |
|---|---|---|---|---|
| 6,424,249 B1 * | 7/2002 | Houvener | .............. | G07C 9/253 340/5.82 |
| 10,503,942 B1 * | 12/2019 | Thurston | ............. | G06F 11/3006 |
| 10,540,388 B1 * | 1/2020 | Alexander | .............. | H04L 67/52 |
| 2003/0139654 A1 * | 7/2003 | Kim | ......................... | A61B 5/16 600/300 |
| 2008/0091738 A1 * | 4/2008 | Devraj | .................. | G06F 16/217 |
| 2008/0126354 A1 * | 5/2008 | Wang | ....................... | G06F 16/27 |
| 2009/0119233 A1 * | 5/2009 | Dunagan | ................ | G06Q 10/04 705/412 |
| 2012/0117571 A1 * | 5/2012 | Davis | .................. | H04L 67/1025 718/105 |

(Continued)

OTHER PUBLICATIONS

English Translation of WO 2005006190. 13 pages. (Year: 2015).*

(Continued)

*Primary Examiner* — Kimberly L Wilson
(74) *Attorney, Agent, or Firm* — Fogarty LLP

(57) ABSTRACT

Systems and methods support a console for use in managing data center operations and in suggesting notifications to present to an administrator issuing a query to the console. Upon detecting a user query, the data center administrator that issued the query is identified. A data center asset that is a subject of the query is also identified. One or more data center assets are identified that are related to the asset that is the subject of the query. Any the related data center assets currently operating with an elevated status designation are identified. Suggested notifications are generated regarding the elevated status designations of the related data center assets. Based on the context of the administrator issuing the query and of the data center status, the administrator may be presented with a portion of the suggested notifications regarding the related data center assets currently operating with an elevated status designation.

19 Claims, 4 Drawing Sheets

(56) References Cited

U.S. PATENT DOCUMENTS

| | | | | |
|---|---|---|---|---|
| 2016/0301624 | A1 * | 10/2016 | Gonzalez | G06F 9/5083 |
| 2017/0201425 | A1 * | 7/2017 | Marinelli | H04L 41/12 |
| 2018/0225365 | A1 * | 8/2018 | Altaf | G06F 16/3344 |
| 2020/0241999 | A1 * | 7/2020 | Guim Bernat | G06F 11/3495 |
| 2020/0356873 | A1 * | 11/2020 | Nawrocke | G06F 16/24535 |

OTHER PUBLICATIONS

International Search Authority (ISA), "International Search Report," International Application No. PCT/US2023/060359, Mar. 17, 2023, 3 pages, publisher Commissioner for Patents—PCT, Alexandria, Virginia, United States of America.
International Search Authority (ISA), "Written Opinion of the International Searching Authority," International Application No. PCT/US2023/060359, Mar. 17, 2023, 11 pages, publisher Commissioner for Patents—PCT, Alexandria, Virginia, United States of America.
The International Bureau of WIPO, "International Preliminary Report on Patentability," International Application No. PCT/US2023/060359, Jul. 30, 2024, 12 pages, WIPO, 34, chemin des Colombettes 1211 Geneva 20, Switzerland.

* cited by examiner

SUGGESTION ENGINE FOR DATA CENTER MANAGEMENT AND MONITORING CONSOLE

FIELD

The present disclosure relates to Information Handling Systems (IHSs) deployed within a data center and more particularly tools for monitoring and management of IHSs deployed in a data center

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In various embodiments, IHSs (Information Handling Systems) are configured to support a console for use in managing data center operations. The IHSs may include: one or more processors; one or more memory devices coupled to the processors, the memory devices storing computer-readable instructions that, upon execution by the processors, cause the IHS to: detect a user query received by the console; identify a data center administrator that issued the query; determine a first data center asset that is a subject of the query; identify a plurality of data center assets that are related to the first data center asset that is the subject of the query; identify any of the related data center assets currently operating with an elevated status designation; generate a plurality of suggested notifications regarding the elevated status designations of the related data center assets; and based on a context of the data center administrator issuing the query and also based on a context of the data center status, determine whether to present the data center administrator with a portion of the suggested notifications regarding the related data center assets currently operating with an elevated status designation.

In some IHS embodiments, execution of instructions by the processor further causes the IHS to determine a topic of the query. In some IHS embodiments, the suggested notifications are generated for related data center assets with elevated status designations of the same topic as the topic of the query. In some IHS embodiments, the topic of the query comprises a performance status of the first data center asset and the suggestion notifications for related data center assets comprise performance status notifications for the related data center assets. In some IHS embodiments, the topic of the query is a power status of the first data center asset and the suggestion notifications for related data center assets comprise power status notifications for the related data center assets. In some IHS embodiments, the first data center asset is a rack-mounted server, the related data center assets are servers in the same rack as the first data center asset. In some IHS embodiments, the suggested notifications are ranked based on a relevance of each suggested notification to the query issued by the user. In some IHS embodiments, the relevance of a suggestion notification of an elevated status designation in the related data center asset is determined based on a severity of the elevated status designation of the related data center asset. In some IHS embodiments, the context of the data center administrator comprises historical information specifying responses to prior suggestions by the data center administrator. In some IHS embodiments, the context of the data center administrator comprises a detected sentiment of the administrator. In some IHS embodiments, the detected sentiment of the administrator indicates the data center administrator comprises an irritated emotional state, and the suggestions pertaining to the related data center assets are not presented to the administrator based on the irritated emotional state of the administrator. In some IHS embodiments, the detected sentiment of the data center administrator is determined based on detected facial expressions by the data center administrator. In some IHS embodiments, the detected sentiment of the data center administrator is determined based on characteristics of user inputs to the IHS by the data center administrator. In some IHS embodiments, the characteristics of user inputs to the IHS by the data center administrator indicates the user is in a stressed emotional state. In some IHS embodiments, the context of the data center status comprises a percentage of data center assets managed by the console that are reporting elevated status designations. In some IHS embodiments, determining whether to present the data center administrator with a suggestion notification is based on a scoring of the relevance of the suggested notification to the query by the data center administrator. In some IHS embodiments, the related data center assets comprise data center assets in physical proximity to the first data center asset within the data center. In some IHS embodiments, the related data center assets comprise data center assets that are logically related to the first data center asset.

In various additional embodiments, methods are provided for managing data center operations via a console operating on an IHS (Information Handling System). The methods may include: detecting a user query received by the console; identifying a data center administrator that issued the query; determining a first data center asset that is a subject of the query; identifying a plurality of data center assets that are related to the first data center asset that is the subject of the query; identifying any of the related data center assets currently operating with an elevated status designation; generating a plurality of suggested notifications regarding the elevated status designations of the related data center assets; and, based on a context of the data center administrator issuing the query and also based on a context of the data center status, determining whether to present the data center administrator with a portion of the suggested notifications regarding the related data center assets currently operating with an elevated status designation.

In various additional embodiments, computer-readable storage devices include instructions stored thereon for managing data center operations via a console operating on an IHS (Information Handling System). Execution of the instructions by one or more processors of the IHS causes the one or more processors to: detect a user query received by the console; identify a data center administrator that issued the query; determine a first data center asset that is a subject of the query; identify a plurality of data center assets that are related to the first data center asset that is the subject of the query; identify any of the related data center assets currently operating with an elevated status designation; generate a plurality of suggested notifications regarding the elevated status designations of the related data center assets; and, based on a context of the data center administrator issuing the query and also based on a context of the data center status, determine whether to present the data center administrator with a portion of the suggested notifications regarding the related data center assets currently operating with an elevated status designation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
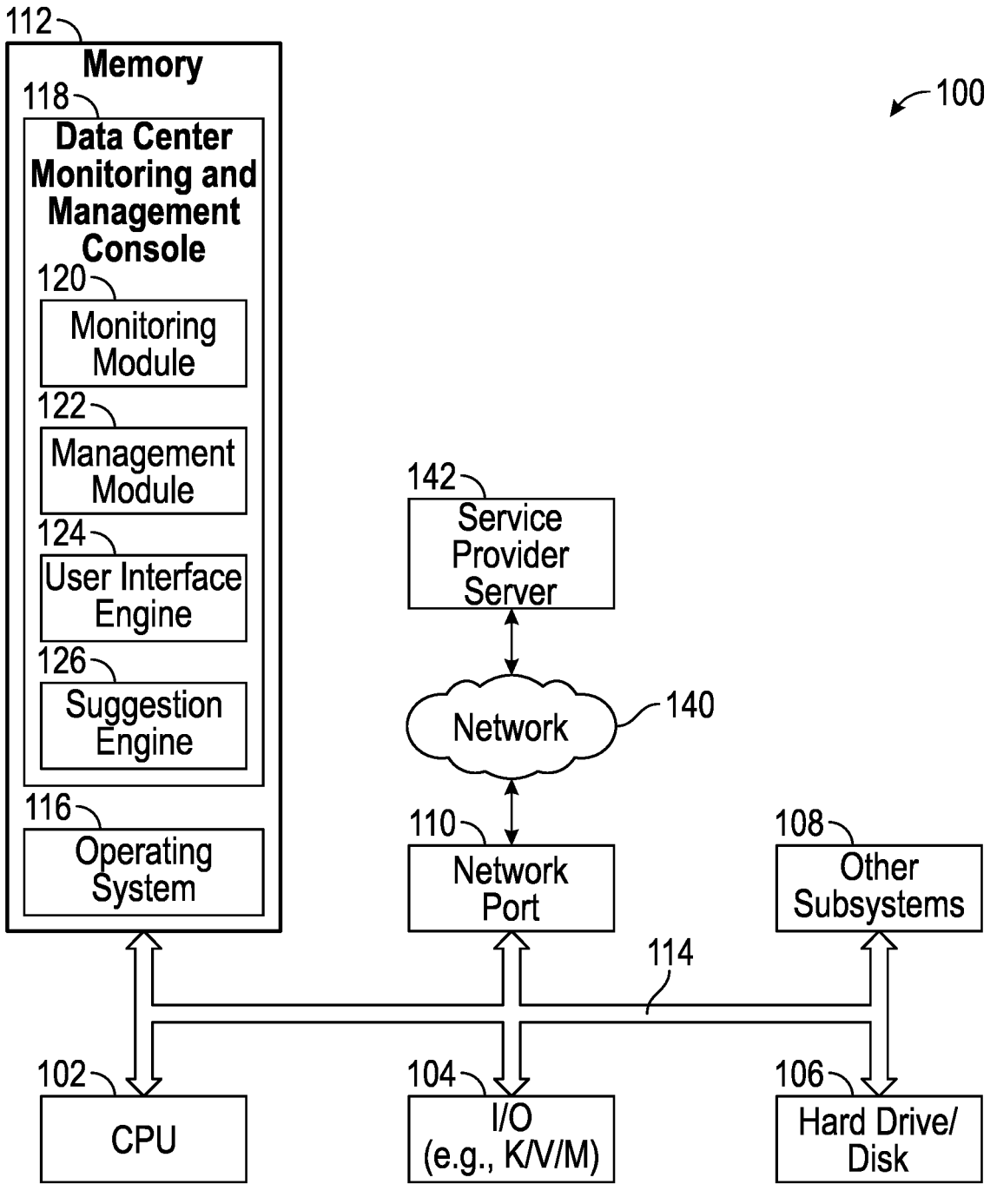
FIG. 1 is a diagram illustrating certain components of an information handling system (IHS), according to embodiments, that is configured to support a suggestion engine of a data center monitoring and management tool.

In the following description, numerous specific details are set forth in order to provide a thorough understanding of embodiments of the present invention. It will be apparent to one skilled in the art that embodiments of the present invention may be practiced without some of these specific details. Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present invention have been illustrated and described, the invention is not limited to these embodiments only. Numerous modifications, changes, variations, substitutions, and equivalents will be apparent to those skilled in the art, without departing from the scope of the invention, as described in the claim FIG. 1 is an illustration of an Information Handling System (IHS) 100 that can be used to implement the systems and methods of the present invention, and in particular, is configured to support a context-aware suggestion engine of a data center monitoring and management tool. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142. In certain embodiments, the data center monitoring and management console 118 may include a monitoring module 120, a management module 122, a user interface engine 124, a suggestion engine 126, or a combination thereof.

As described in additional detail below, in certain embodiments, the data center monitoring and management console 118 may include a suggestion engine 126 which may provide assistance in the monitoring and management of the data center assets by providing relevant suggestions to a user of the management console 118, where the suggestions that are provided are related to a query made to the management console 118 by the user. The suggestion engine 126 may monitor queries to the user interface engine 124 by the user, and may provide the user with related information regarding the operation of the datacenter. In various embodiments, the suggestion engine 126 may use rules-based, pattern matching, machine learning, or AI approaches in order to determine the relevant data center information to provide the user. Moreover, the relevancy of data center information that is related to a user query may be determined based on the context of the query itself, the user's behavior, the history of the user in relation to the query and/or prior suggestions by the suggestion engine 126. The suggestion engine 126 may be implemented such that it only presents the user with notifications deemed relevant based on the current context, with data center notifications deemed irrelevant being suppressed and not presented to the user.

In this manner, the suggestion engine 126 may provide a user with immediate information related to the user's query and may also preemptively identify important datacenter phenomena for the user of the monitoring and management console. In determining whether to present suggested information to a user upon detecting a query by the user, the suggestion engine 126 may consider user behavior, user activity and/or user history. In providing relevant suggestions for the particular context in which the user and datacenter are operating in, the suggestions engine 126 provides users with a thorough and accurate understanding of the issue the user is investigating, while also providing the user with a wider perspective of the issue they are querying, while not burdening the user with unhelpful information.

Figure 2:
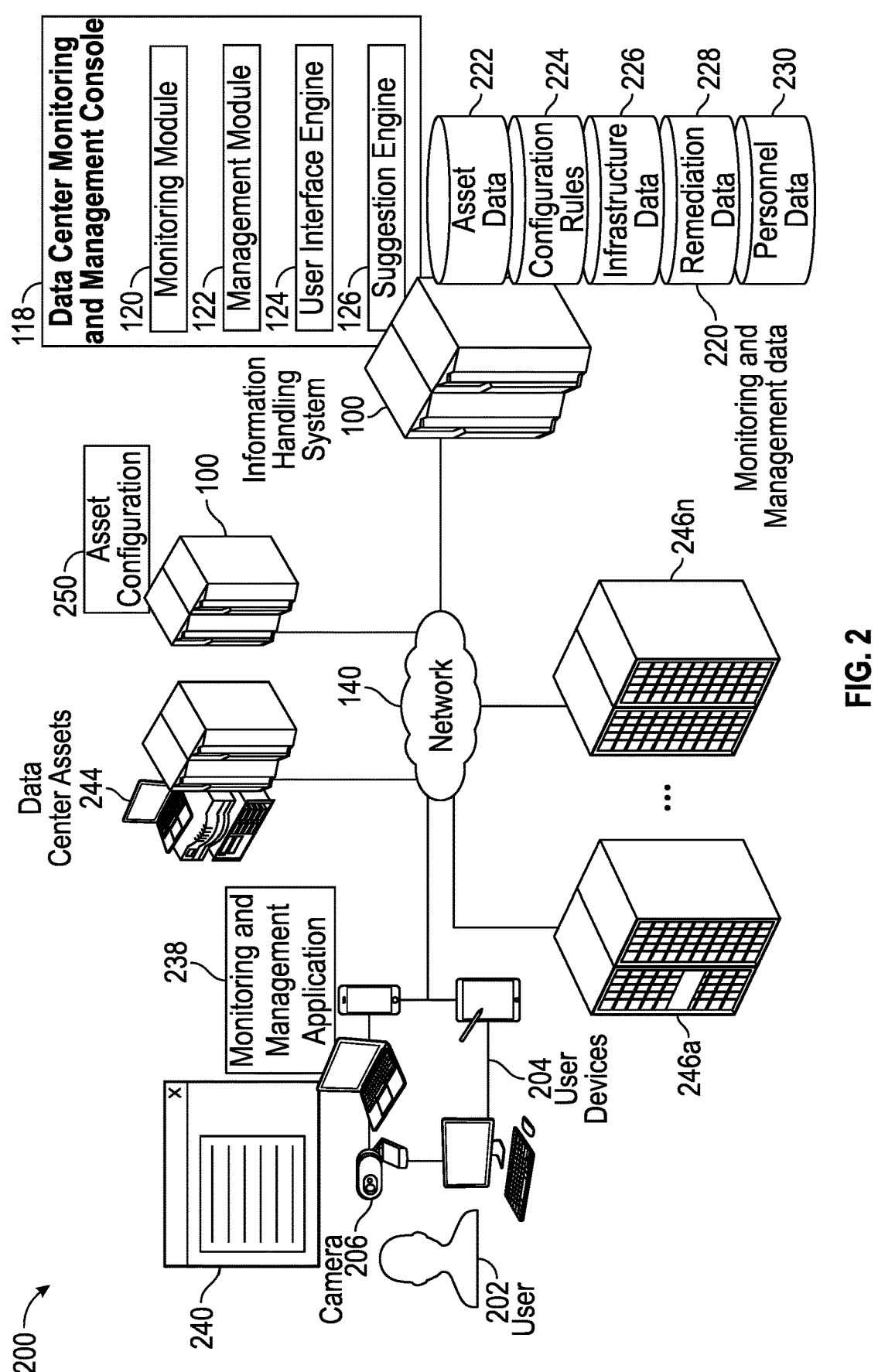
FIG. 2 is a diagram of a data center system configured to support a suggestion engine of a data center monitoring and management tool, according to embodiments.

FIG. 2 is a diagram of a monitoring and management environment 200 for a data center system that includes a console 118 configured to support a suggestion engine of a data center monitoring and management tool, according to embodiments. As used herein, a data center broadly refers to a building, a dedicated space within a building, or a group of buildings, used to house a collection of interrelated data center assets 244 implemented to work in combination with one another for a particular purpose. As likewise used herein, a data center asset 244 refers to any IHS, an individual hardware component or software that operates within the data center. In certain embodiments, a data center asset 244 may include a product, or a service, or a combination of the two. Examples of data center assets 244 may include personal computers (PCs), laptop PCs, tablet computers, rack-mounted servers, mainframe computers, Redundant Arrays of Independent Disks (RAID) storage units and their internal components. Likewise, examples of network devices that are data center assets 244 may include routers, switches, hubs, repeaters, bridges, gateways, and so forth. In some embodiments, data center asset 244 may include certain data center personnel, such as a data center system administrator, operator, or technician. Other examples of a data center asset 244 may include maintenance, repair, and operations (MRO) items, such as replacement and upgrade parts for other data center assets 244. In certain embodiments, such MRO items may be in the form of consumables, such as air filters, fuses, and fasteners. Data center asset 244 may also include software, firmware, and instructions used by hardware components that are themselves data center assets.

In certain embodiments, the data center may be managed by administrators 202 using a may include a data center monitoring and management console 118. The data center monitoring and management console 118 may operate in support of any task, function, procedure, or process performed, directly or indirectly, within a data center monitoring and management environment 200 in order to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. For example, monitoring a particular data center asset 244 may be used to generate an alert if an operational status exceeds certain parameters. For instance, an internal cooling fan of a server may begin to fail, which in turn may cause the operational temperature of the server to exceed its rated level. In this example, the server may be implemented to generate an alert, which provides notification of the occurrence of a data center issue. In certain embodiments, the data center monitoring and management console 118 may be implemented to receive such alerts corresponding to issues in the data center.

In certain embodiments, the data center monitoring and management console 118 may be implemented to include a monitoring module 120, a management monitor 122, and a user interface (UI) engine 124, a suggestion engine 126, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may generate and/or support any number of UIs for monitoring and management of data center assets 244.

In certain embodiments, the data center monitoring and management environment 200 may include a repository of monitoring and management data 220. In certain embodiments, the repository of monitoring and management data 220 may be local to the information handling system 100 executing the data center monitoring and management console 118, or may be located remotely from the console. In various embodiments, the repository of monitoring and management data 220 may include certain information associated with data center asset data 222, data center asset configuration rules 224, data center infrastructure data 226, data center remediation data 228, and data center personnel data 230.

As used herein, data center asset data 222 refers to information associated with data center assets 244. For example, asset data 222 associated with a particular server of the data center may include the number and type of processors the server can support, the speed and architecture, minimum and maximum amounts of memory supported by these processors, various storage configurations supported by the server and the number, type, and speed of input/output ports of the server. Data center asset configuration rules 224 may include rules used to configure data center assets 244. In certain embodiments, asset configuration rules 224 may be used to verify that a particular data center asset 244 configuration is the most optimal for a location in the data center, for a workload, or to interact with other data center assets 244. In certain embodiments, an asset configuration system 250 may be used through the console 118 to perform a data center asset configuration or remediation operation using the configuration rules 224. Data center infrastructure 226 data may include data associated with infrastructure of the data center and may include data describing physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, and/or physical security systems. Data center personnel data 230 may include any data associated with data center personnel who may procure, deploy, configure, repair, manage, and/or operate data center assets 244.

Data center remediation data 228 may include information associated with the remediation of data center issues, such as the date and time an alert was received indicating the occurrence of the data center issue, the amount of elapsed time before a remediation operation was begun after receiving the alert, and the amount of elapsed time to complete a remediation operation. Data center remediation data 228 may also include information related to frequency of data center issues, information related to causes and error codes associated with data center issues, and the location of data center assets 244 associated with a data center issue. Data center remediation data 228 may also include information associated with data center asset 244 replacement parts, dependencies, documentation, tools, diagnostic equipment, personnel, software upgrades, or third-party services that are associated with a data center remediation operation.

As illustrated, the data center monitoring and management environment 200 includes one or more data centers 246*a-n*. In certain embodiments, a data center asset 244 may be implemented to process a workload. A workload may be a measure of information processing that can be performed by one or more data center assets 244, individually or in combination with one another, within a data center monitoring and management environment 200. In certain embodiments, a workload may be implemented to be processed in a virtual machine (VM) environment, familiar to skilled practitioners of the art. In various embodiments, a workload may be implemented to be processed as a containerized workload, likewise familiar to those of skill in the art.

In various embodiments, the data center monitoring and management console 118, may implement failure tracking though the capture of data center asset 244 telemetry. In various embodiments, the data center asset 244 telemetry may include data associated with the occurrence of events, such as the failure, or anomalous performance, of a particular data center asset 244, or an associated workload 360. In certain embodiments, the data center asset 244 telemetry may be captured incrementally to provide a historical perspective of the occurrence, and evolution, of an associated data center issue.

In certain embodiments, a user 202 may operate a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain of these embodiments, the mobile user device 204 may be used at various locations within the data center monitoring and management environment 200 by the user 202 when performing a data center monitoring and management operation, described in greater detail herein. In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation of data center monitoring and management information generated by console 118. In certain embodiments, the UI engine 124 may be implemented to generate and/or provide data for the data center monitoring and management console UI 240. In addition to the UI, in certain embodiments, various additional data center monitoring and management applications 238 may operate on a particular user device 204 and may be utilized in generating context aware suggestions. For instance, in certain embodiments, a data center monitoring and management application 238 may utilize Global Positioning System (GPS) capabilities of the user device 204 and GPS location information for data center assets 244, such as provided in asset data repository 222, to determine the physical location of the user 202 in relation to the physical location of a particular data center asset 244. In such embodiments, physical proximity information may be utilized in determining, by suggestion engine 126, whether to present relevant information to the user 202 via the UI 240. For instance, in response to a user query, relevant suggestions may be generated that pertain to assets that are far away from the user 204 and for assets that are very close to the user 204. Relevant suggestions may be surfaced for assets in close proximity to the user 204, while assets further from the user are not surfaced.

As described, data center monitoring and management console 118 includes UI engine 124 that supports any number of UIs for monitoring and management of data center asset 244s. Though capabilities supported by the UI engine 124, user 202 may utilize a user device 204 to interact with the console 118. The various UIs supported by the UI engine 124 may support various types of user queries and search functionalities. Each of the UIs may be instrumented by the UI engine 124 to provide the search query entered by the user to the suggestion engine 126. The UI engine 124 of the console 118 may be implemented to receive queries provides through various types of user inputs, which can include text inputs, menu selections and speech inputs. As described in additional detail below, the suggestion engine 126 analyzes the queries receive by the UI engine 124 in order generate suggested notifications that relate to their query, where the suggestions may pertain to assets that are logically and/or physically related to an asset that is a subject of the query. Embodiments determine whether to actually provide a generated suggestion to the user based on the context of the query. The context of the query may be based on current operational status of the user/or data center and may be determined based on information provided by telemetry data, historical information compiled from responses to prior suggestions presented to the user, detected sentiments of the user, etc.

As described, a camera 206 may be integrated into the user device 204. In various embodiments, the camera 206 may be used to capture data then is utilized in ascertaining the sentiment, or other emotional state, of the user while the user is operating the UI 240 and input the query to the UI. The camera 206 may capture various types of visual information associated with a user's 202 facial expressions, micro-expressions, changes in facial color, eye movement, pupil dilation, body gestures, and/or body language. Additional or alternative emotional information may be determined based a user's 202 gestures or other inputs to the user device 204. In certain embodiments, such user 202 gestures detected by user device 204 and used to infer an emotion state of the user may include keystrokes on a keypad, cursor movement, mouse clicks, finger swipes, taps and hand gestures. In certain embodiments, the emotional information associated with a user's 202 gestures detected by user device 204 may likewise include the cadence of the user's 202 keystrokes, the force and duration keystrokes and characteristics of the motions used in hand and finger gestures. The context suggestion engine 126 may utilize various rules-based, pattern matching, machine learning, and AI techniques in identifying and classifying the user inputs to user device 204.

As described below, when a query is detected by UI engine 124 and provided to the suggestion engine 126, the query is processed to ascertain a topic of the query and an asset that is the subject of the query. The context suggestion engine 126 generates a ranked lists of suggestions that relate to the topic and/or asset that have been parsed from the query. Based on the contest of the query, the context suggestion engine 126 surfaces the most relevant of these suggestions to the user, while suppressing less relevant suggestions. In this manner, the suggestion engine 126 generates suggestions that can be provided along with responses to user queries or searches, where these suggestions provide the user with information pertaining to related assets and/or conditions detected by the datacenter monitoring and management console 200.

Figure 3:
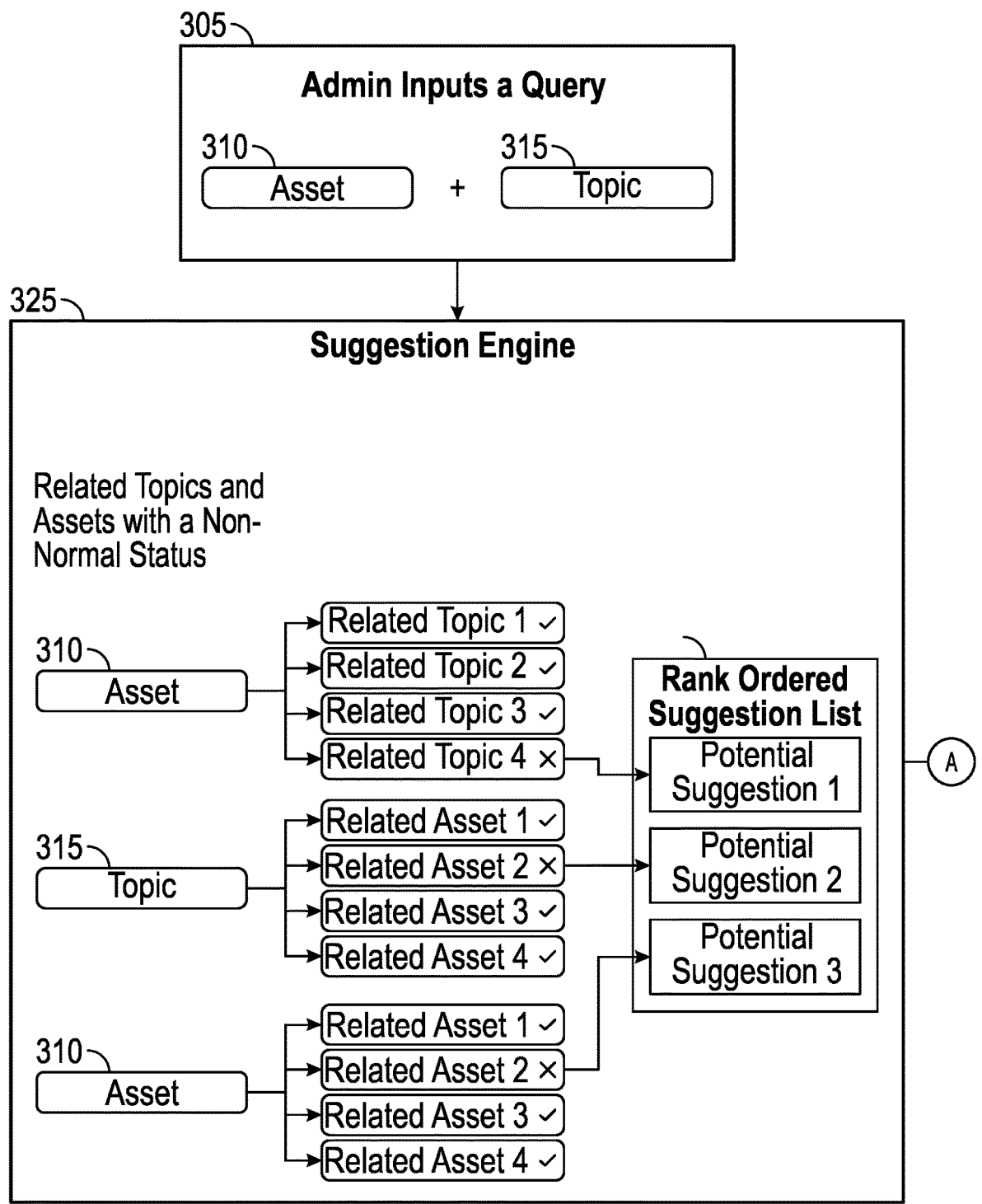
FIG. 3 is a flowchart describing certain steps of a method, according to embodiments, for operating a suggestion engine of a data center monitoring and management tool.
Figure 3:
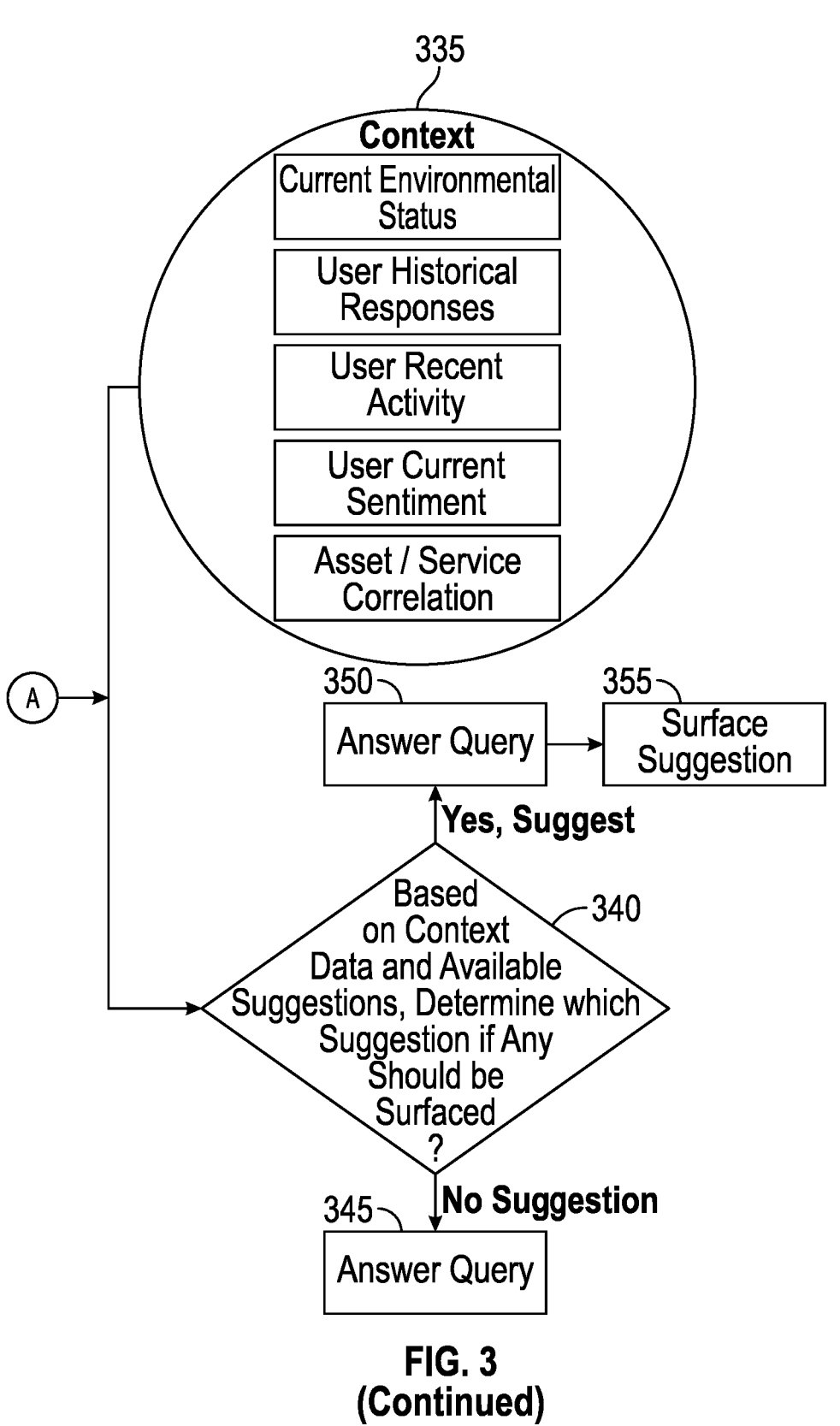

FIG. 3 is a flowchart describing certain steps of a method, according to embodiments, for operating a suggestion engine of a data center monitoring and management tool. As described, a query may be provided as an input to a data center monitoring and management console that includes a monitoring module, a management module, a user interface engine and a suggestion engine 325. The UI engine may simultaneously support UIs for different user sessions, each operating their own user device, such as described above. Accordingly, in response to the UI engine receiving a query at one of these user interfaces, the data center monitoring and management console identifies the data center administrator that issued the query to the console. In some embodiments, the user may be identified based on login information. In some embodiments, data gathered by the camera of a user device from which a query was issued may be used to identify the user through biometric capabilities supported by the user device, in some cases through the use of biometric prints retrieved from personnel data repository 230. In instances where user queries are received as voice inputs, voice prints maintained in personnel data repository 230 may be used to identify the user that has spoken the query.

In certain embodiments, at 305, a received query is broken down into at least one asset 310 and a topic 315 of the query. In analyzing received queries, the console and/or suggestion engine 325 may process and analyze large amounts of natural language data. Natural Language Processing (NLP) libraries and techniques may be utilized by the suggestion engine 325 to convert the query into a simplified form, such as identification of root words and keywords. From the root words and keywords that result from the natural language processing of the submitted issue, these NLP techniques that are augmented with AI are trained to break down queries until the suggestion engine 325 identifies a topic 315 of the query and an asset 310 that is the subject of the query.

Upon a query being input by a user to a UI supported by the UI engine, at 305, a topic of the query is determined based on keywords parsed from the query. For instance, the topic of health can be determined by detecting keywords such as 'condition' or 'health.' The topic of status can be determined by detecting keywords such as 'working,' 'operational' or 'status.' The topic of capacity can be determined by detecting keywords such as 'space' or 'full.' The topic of performance can be determined by detecting keywords such as 'speed,' 'slow' or 'fast.' The topic of power can be determined by detecting keywords such as 'power' or 'volts.' The topic of thermal status can be determined by detecting keywords such as 'temperature' or 'hot.' In analyzing the queries in this manner, NLP libraries techniques may be used to parse keywords from the user's query and various AI techniques may be used for discerning topics from these keywords.

In a similar manner, the suggestion engine may utilize NLP libraries and techniques to determine an asset 310 that is the subject of the query. For instance, a specific rack-mounted server may be identified as the asset 310 based on the detection of the server's service tag or other unique identifier in the query, where suggestion engine 325 may rely on asset data 222 in order to confirm an alphanumeric string in the query is an identifier for a specific asset. The suggestion engine 325 may similar identify various other types of assets such as routers and networks switches based on the detection of unique identifiers of these components. Even if a specific asset cannot be identified, the user query may nonetheless utilize a keyword that specifies a type of asset, such as 'switch,' 'power supply,' 'drive,' 'storage,' 'NIC,' 'memory' and 'server.' As described with regard to FIG. 2, in some embodiments, data center assets may include personnel, software, services and/or infrastructure. Accordingly, deriving a personnel asset from a query may include determining that a query pertains to a specific individual ('Where is Michael?') or type of administrator ('repair technician'). Assets 310 derived from queries may be physical systems, such as a server or storage device, and may also be a virtual system, such as a virtual machine or a logical collection of storage drives. In some instances, an asset 310 derived from a query may be more generalized, such as all physical and logical systems that support a specific workload or application With the topic 315 and an asset 310 derived from the user's query, the suggestion engine 325 determines suggested notifications that are relevant to the query. In some instances, the suggestion engine 325 may begin searching for relevant suggestions by identifying data center assets that are related to the data center asset that has been determined to be the subject of the query. In various embodiments, an asset may be determined to be related based on logical and/or physical relationships with the asset that is the subject of the query. For instance, a related data center asset may be an asset in physical proximity to the asset that is the subject of query. In a scenario where a specific rack-mounted server has been identified as the subject of the query, related assets may be all servers within the same data center or within the same rack as the server identified in the query. Assets in physical proximity may also be based on physical distances between the assets. For instance, where the asset that is the subject of the query is specific administrator, assets in physical proximity may include other administrators located within a certain distance from the administrator the user is inquiring about.

In some instances, related assets may be logically related to the asset that is the target of the query. For example, related assets may be of a same type as the asset that is the target of the query. Such as identifying network switches as related assets when the target of the query is a network switch. In another example, related assets may be logically related through a common configuration, such as other storage drives used in the same type of RAID configuration or using the same firmware. In another example, related assets may be logically related through a common configuration status, such as assets with the same configuration drift classification when measured against a baseline configuration for the assets. In another example, related assets may be logically related through a performance status, such as all other assets reporting resource exhaustion, or the same type of resource exhaustion, or reporting the same power status.

In order to generate relevant suggestions pertaining to the user query, embodiments may determine whether any of the related data center assets are currently operating with an elevated status designation. For instance, if a query pertains to a storage drive, the related assets may be other storage drives of the same type or within the same rack-mounted server. In a datacenter environment, some assets, such as storage drives, may be present in large numbers. Accordingly, when evaluating whether related assets are actually relevant, embodiments may first consider the related assets that have an elevated or otherwise noteworthy status designation. Such elevated status designations may include assets reporting error conditions, low resource levels, warnings, etc.

The suggestion engine 325 may then determine a list of possible suggestions that provide notifications pertaining to related assets with elevated status designations. In some instances, the complete list of generated suggestions may include notifications of the elevated status designations for all related assets, whether logically or physically related to the asset that is the subject of the query. In some instances, these suggestions may be limited to notifications for all related assets, but may only include notifications the pertain to the same topic as the topic of the query. For example, where the topic of the query is determined to be power information and the asset is a particular rack-mounted server, suggestions may include power notifications for all servers that are logically or physically related to this particular server.

As indicated in FIG. 3, the generated suggestions may be compiled into a ranked list 430, with the highest ranked suggestions being the most relevant to the user's query. The suggestion engine may rank the suggestions using various techniques and based on various criteria. For instance, the suggestions may be ranked based on a similarity to the query, such as a similarity with regard to topic. For example, within a list of suggestions generated in response to a power status query by the user, the suggestions that are also power status related may be ranked higher. In such instances, further ranking of these particular suggestions may rank power status suggestions for similar assets higher within the ranked list. For example, within a list of suggestions generated in response to a query for the power status of a specific sever, power status suggestions related to servers would be ranked higher than power status suggestions related to switches.

In some embodiment, the suggestion engine rank orders the suggestions of related asset notifications based on a scoring mechanism that accounts for the importance of the related assets and also accounts for characteristics of the elevated status designation that is included in the suggested notification. For instance, suggestions that pertain to critical status notifications are scored higher than suggestions that pertain to warning notifications. The scoring mechanism used to rank the list of suggestions may be a points-based scoring system that determines a score for each suggestion, such as by summing points accrued based on characteristics of the suggested notification. For example, more points may be assigned to a suggested notification reporting severe resource exhaustion in a related server, verse fewer points being assigned for notification reporting the server is detecting moderately elevated internal temperatures. In another example, more points may be assigned to a suggestion's score based on value of the related asset. A notification reporting an error condition by a customized FPGA that supports critical security protocols may be assigned more points than a suggestion providing notification of an error condition in a storage drive that is part of a RAID configuration providing data redundancy. In another example, points may be assigned based on a suggestion's time sensitivity, such as an estimated time before failure or other impact to the user or datacenter. In another example, points may be assigned to a suggestion's score based on the degree of physical proximity of the related asset to the asset that is the target of the query, with a closer proximity resulting in more points being assigned to a suggestion.

Based on such types of scoring criteria, each of the suggestion in the ranked list 330 may be ordered according to the score assigned to the suggestion. Once the list or suggestions has been ranked, the suggestion engine must determine what portion of these suggestions, if any, to surface to the user, such as through notifications presented via the user interface that was used to issue the query at 305. In some embodiments, this determination may be made based on the context in which the query is made, where the considered context may include a user's context and a datacenter context. For instance, the datacenter context may include an operational status of the data, such as a percentage of data center assets managed by the console that are reporting elevated status designations. The operational status of a datacenter may be a categorization maintained by the console based on collected telemetry information and which may reflect levels of overall resource exhaustion and error states in the data center. The operational context of the datacenter may also be based on the number of errors or other notifications that have been presented to the user over a recent time interval. In scenarios where the data center context indicates a large number of concurrent issues, any suggestions provided to the user may unhelpful, or any suggestions that are provided must pass a very high threshold of relevance, as may be determined based on the scoring of the suggestion within the ranked list 330.

In addition to the data center context, embodiments may also account for the context of the user that issued the query. In some embodiments, the user context may be determined from patterns of behavior by the user. For instance, historical information specifying a user's reaction to responses to prior suggestions by the suggestion engine may be considered. For example, the user context may result in a minimal number of suggestions being surfaced to the if that user has a history of ignoring all suggestions, or all suggestions of a certain type, such as suggestions pertaining to conditions in related storage drives or power status suggestions. Conversely, a user with a history of clicking on suggestions may be more receptive to receiving additional suggestions, or at least suggestions of a certain type, such as suggestions relating to the availability of personnel.

As described, a device by which the user submits a query may be instrumented with capabilities for detecting a sentiment of the user, such as based on facial expression detected by a camera of the user's device. Through such capabilities, embodiments may determine that a user's facial expressions indicate the user in an irritated emotional state. In other embodiment detected sentiment of the administrator indicates the data center administrator is an irritated emotional state such that a minimal number of suggestions should be presented to the user. In other instances, facial expressions of the user detected by the user device may indicate the user is in a confused yet unhurried state, such that relevant suggestions may be well received by the user. Also as describe, a user's sentiment may additionally or alternatively be inferred from other inputs to the user's device, such as characteristics of keystrokes, pointing device inputs and/or gestures by the user that indicate the user is in a stressed state during which only the most relevant and critical suggestions should be surfaced to the user.

As indicated in FIG. 3, at 340, the suggestion engine processes the ranked list of suggestions 330 and the context information 335 in order to determine what portion of the ranked list of suggestions to surface to the user. If the suggestion engine determines that none of the suggestions are sufficiently relevant to the user query and/or the relevance of the suggestions is too low to warrant providing the suggestions to the user based on the context in which the query was made, at 345, the monitor provides the user with any available answer to their query, but does not provide the user with any of the suggestions from the ranked list 330. However, if the context of the query indicates suggestions should be surfaced to the user, at 350, the user is provided with any answer to the query, and the most relevant suggestion ranked list are surface, at 355, to the user.

In various embodiments, the relevant suggestions that are presented may be via notifications, such as pop-up dialogs, support by the user interface by which the user made the query. In some cases, the notifications may provide the user with the ability to click on suggestion for additional information, including information describing the relevance of the suggestion, such as due to the suggestion pertaining to the health of a related server that is in the same rack as the server that is the subject of the user's query. In another example, a relevance of a suggestion may be based on related assets having a similar configuration to the asset that is the target of the query, such that similar administrative procedures could be performed on these related assets. For instance, in response to a query seeking the firmware status of a storage drive, suggestions may be provided that inform the user of other storage drives with that same firmware status and may also include a link by which the firmware of the related asset can be upgraded.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) configured to support a console for use in managing data center operations, the IHS comprising:
   one or more processors; and
   one or more memory devices coupled to the one or more processors, the one or more memory devices configured with stored computer-readable instructions that, upon execution by the one or more processors, cause the IHS to:
      detect a user query received by the console;
      identify a data center administrator that issued the query;
      determine a first data center asset that is a subject of the query, based at least in part on a parse of the query to detect an alphanumeric asset identifier that comprises a service tag, and match the service tag to asset identifiers stored in an asset repository;
      identify a plurality of data center assets that are related to the first data center asset, wherein the related data center assets comprise at least servers in a same rack as the first data center asset;
      identify, based at least in part on data center asset telemetry, any of the related data center assets currently in a failure status or anomalous performance;
      generate a plurality of suggested notifications in regard to the related data center assets currently in the failure status or anomalous performance;
      compute, for each suggested notification, a points-based score that comprises a sum of points assigned for: (i) severity of the failure status derived from the data center asset telemetry, (ii) criticality or value of the related data center asset from the asset repository, (iii) time-sensitivity of remediation for the related data center asset, and (iv) physical proximity of the related data center asset to the first data center asset or to the data center administrator;
      set a dynamic threshold to surface suggested notifications based on a data center context that comprises at least a percentage of managed data center assets that report elevated status, and a recent notification rate; and
      present to the data center administrator, via a display on the console:
         available answers to the subject of the query, with a link to address the subject of the query; and
         suggested notifications in regard to the related data center assets whose points-based scores exceed the dynamic threshold, with a link to address the failure status.

2. The IHS of claim 1, wherein execution of instructions by the processor further causes the IHS to use Natural Language Processing (NLP) libraries and/or techniques augmented with Machine Learning (ML) and/or Artificial Intelligence (AI) to determine a topic of the query.

3. The IHS of claim 2, wherein the suggested notifications are generated for related data center assets with failure status of a same topic as the topic of the query.

4. The IHS of claim 3, wherein the topic of the query comprises a performance status of the first data center asset and wherein the suggestion notifications for related data center assets comprise performance status notifications for the related data center assets.

5. The IHS of claim 4, wherein the topic of the query is a power status of the first data center asset and wherein the suggestion notifications for related data center assets comprise power status notifications for the related data center assets.

6. The IHS of claim 1, wherein the suggested notifications are ranked based on a relevance of each suggested notification to the query issued by the user.

7. The IHS of claim 6, wherein the relevance of a suggestion notification of a failure status in the related data center asset is determined based on a severity of the failure status of the related data center asset.

8. The IHS of claim 1, wherein the context of the data center administrator comprises historical information that specifies responses to prior suggestions by the data center administrator.

9. The IHS of claim 1, wherein the context of the data center administrator comprises a detected sentiment of the administrator.

10. The IHS of claim 9, wherein the detected sentiment of the administrator, based on a detected facial expression of the administrator, indicates the data center administrator comprises an irritated emotional state, and wherein the suggestions that pertain to the related data center assets are not presented to the administrator based on the irritated emotional state of the administrator.

11. The IHS of claim 9, wherein the detected sentiment of the data center administrator is determined based on detected facial expressions by the data center administrator.

12. The IHS of claim 9, wherein the detected sentiment of the data center administrator is determined based on characteristics of user inputs to the IHS by the data center administrator.

13. The IHS of claim 12, wherein the characteristics of identified and classified user inputs to the IHS by the data center administrator indicate the user is in a stressed emotional state.

14. The IHS of claim 1, wherein the context of the data center status comprises a percentage of data center assets managed by the console that report a failure status.

15. The IHS of claim 1, wherein a determination whether to present the data center administrator with a suggestion notification is based on a score of relevance of the suggested notification to the query by the data center administrator.

16. The IHS of claim 1, wherein the related data center assets comprise data center assets in physical proximity to the first data center asset within the data center.

17. The IHS of claim 1, wherein the related data center assets comprise data center assets that are logically related to the first data center asset.

18. A method for managing data center operations via a console operating on an Information Handling System IHS, the method comprising:

detecting a user query received by the console;

identifying a data center administrator that issued the query;

determining a first data center asset that is a subject of the query, based at least in part on parsing the query to detect an alphanumeric asset identifier that comprises a service tag, and matching the service tag to asset identifiers stored in an asset repository;

identifying a plurality of data center assets that are related to the first data center asset, wherein the related data center assets comprise at least servers in a same rack as the first data center asset;

using data center asset telemetry, identifying any of the related data center assets currently operating with a failure status indicating an anomalous performance of the related data center asset or an associated workload;

generating a plurality of suggested notifications regarding the failure status of the related data center assets;

computing, for each suggested notification, a points-based score that comprises a sum of points assigned for: (i) severity of the failure status derived from the data center asset telemetry, (ii) criticality or value of the related data center asset from the asset repository, (iii) time-sensitivity of remediation for the related data center asset, and (iv) physical proximity of the related data center asset to the first data center asset or to the data center administrator;

setting a dynamic threshold to surface suggested notifications based on a data center context that comprises at least a percentage of managed data center assets that report elevated status and a recent notification rate; and presenting, to the data center administrator, via a display on the console:

available answers to the subject of the query, with a link to address the subject of the query; and suggested notifications regarding the related data center assets whose points-based scores exceed the dynamic threshold, with a link to address the failure status.

19. A non-transitory computer-readable storage device configured with instructions stored thereon for management of data center operations via a console that operates on an Information Handling System (IHS), wherein execution of the instructions by one or more processors of the IHS causes the one or more processors to:

detect a user query received by the console;

identify a data center administrator that issued the query based on capture of biometric data from the data center administrator and automatically match the captured biometric data with biometric print data retrieved from a personnel data repository;

determine a first data center asset that is a subject of the query, based at least in part on a parse of the query to detect an alphanumeric asset identifier that comprises a service tag, and match the service tag to asset identifiers stored in an asset repository;

identify a plurality of data center assets that are related to the first data center asset, wherein the related data center assets comprise at least servers in a same rack as the first data center asset;

automatically assign failure events to any of the related data center assets currently in a failure status or anomalous performance as determined from data center asset telemetry;

generate a plurality of suggested notifications in regard to the failure events of the related data center assets;

compute, for each suggested notification, a points-based score that comprises a sum of points assigned for: (i) severity of the failure status derived from the data center asset telemetry, (ii) criticality or value of the related data center asset from the asset repository, (iii) time-sensitivity of remediation for the related data center asset, and (iv) physical proximity of the related data center asset to the first data center asset or to the data center administrator;

set a dynamic threshold to surface suggested notifications based on a data center context that comprises at least a percentage of managed data center assets that report elevated status and a recent notification rate;

present, to the data center administrator, via a display on the console:

available answers to the subject of the query, with a link to address the subject of the query, and suggested notifications in regard to the related data center assets whose points-based scores exceed the dynamic threshold, with a link to address the failure events.

\* \* \* \* \*